United States Patent
Sakamoto (10) Patent No.: US 8,525,890 B2
(45) Date of Patent: Sep. 3, 2013

(54) PROJECTED-IMAGE BASED PHOTOGRAPHING APPARATUS CONTROL SYSTEM

(75) Inventor: Shoji Sakamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 395 days.

(21) Appl. No.: 12/411,931

(22) Filed: Mar. 26, 2009

(65) Prior Publication Data

US 2010/0066865 A1    Mar. 18, 2010

(30) Foreign Application Priority Data

Sep. 16, 2008   (JP) .................................. 2008-236617

(51) Int. Cl.
*G03B 21/00* (2006.01)
*G03B 21/26* (2006.01)
*G09G 5/00* (2006.01)
*H04N 5/225* (2006.01)

(52) U.S. Cl.
USPC ................... 348/211.99; 348/136; 348/211.4; 348/240.2; 353/28; 353/30; 353/42

(58) Field of Classification Search
USPC .................................................. 353/40–42
See application file for complete search history.

(56) References Cited

U.S. PATENT DOCUMENTS

| | | | | |
|---|---|---|---|---|
| 4,100,572 A * | 7/1978 | Perisic | ......................... | 348/578 |
| 5,969,754 A * | 10/1999 | Zeman | ......................... | 348/136 |
| 6,239,835 B1 | 5/2001 | Hori | | |
| 7,023,483 B2 * | 4/2006 | Pollard et al. | ................. | 348/351 |
| 8,118,433 B2 * | 2/2012 | Ishii | ............................... | 353/42 |
| 2002/0080239 A1 * | 6/2002 | Ikeda et al. | ................... | 348/207 |
| 2003/0112415 A1 * | 6/2003 | Hsu et al. | ........................ | 353/42 |
| 2005/0078203 A1 * | 4/2005 | Akutsu | ..................... | 348/240.99 |
| 2006/0098167 A1 * | 5/2006 | Sato | ............................... | 353/35 |
| 2006/0284985 A1 * | 12/2006 | Tokai | ....................... | 348/211.99 |
| 2007/0177013 A1 * | 8/2007 | Shingu | .......................... | 348/143 |
| 2009/0002510 A1 * | 1/2009 | Uchihashi et al. | ......... | 348/222.1 |
| 2009/0195674 A1 * | 8/2009 | Tokai et al. | .............. | 348/240.99 |

FOREIGN PATENT DOCUMENTS

| | | |
|---|---|---|
| JP | 5-60047 U | 8/1993 |
| JP | 08-125921 A | 5/1996 |
| JP | 2004-187140 A | 7/2004 |
| JP | 2008-129120 A | 6/2008 |

OTHER PUBLICATIONS

Japanese Office Action issued in corresponding Japanese Application No. 2008-236617, dated Sep. 11, 2012.

* cited by examiner

*Primary Examiner* — John Villecco
*Assistant Examiner* — Dwight C Tejano
(74) *Attorney, Agent, or Firm* — Sughrue Mion, PLLC (57) ABSTRACT

Provided is a photographing apparatus that includes a photographing section that photographs a subject, and a controller that controls a photographing range of the photographing section based on a range specification image that is projected onto the subject.

2 Claims, 10 Drawing Sheets

PROJECTED-IMAGE BASED PHOTOGRAPHING APPARATUS CONTROL SYSTEM

CROSS-REFERENCE TO RELATED APPLICATION

This application is based on and claims priority under 35 USC 119 from Japanese Patent Application No. 2008-236617 filed Sep. 16, 2008.

BACKGROUND

1. Technical Field

This invention relates to a photographing apparatus and a photographing system.

2. Related Art

It is known that there is a photographing apparatus (a video camera for example) that can control an oscillating angle and a zoom magnification by a remote operation of a user. It is also known that there is a photographing apparatus that can adjust an oscillating angle and a zoom magnification automatically based on a desired photographing area that user specified with markers.

SUMMARY

According to an aspect of the invention, there is provided a photographing apparatus including a photographing section that photographs a subject and a controller that controls a photographing range of the photographing section based on a range specification image that is projected onto the subject.

BRIEF DESCRIPTION OF THE DRAWINGS

Exemplary embodiments of the present invention will be described in detail based on the following figures, wherein.

DETAILED DESCRIPTION

Referring to the accompanying drawings, examples will be now described.

Figure 1:
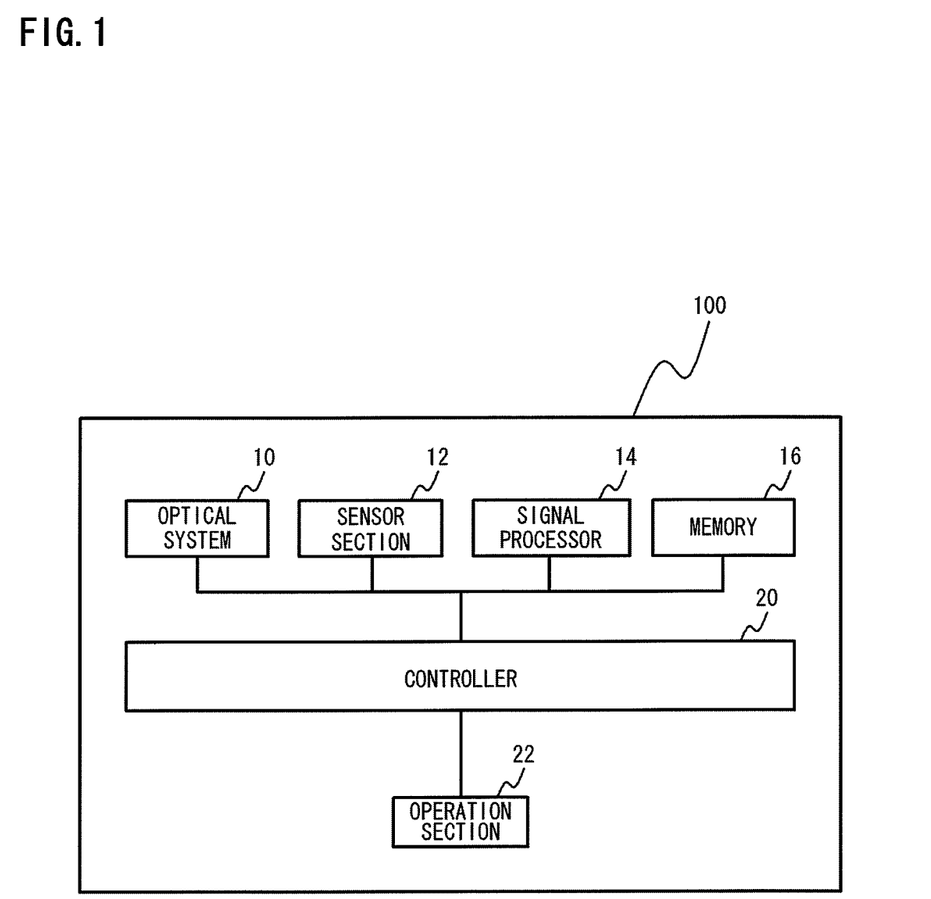
FIG. 1 is a block diagram of a photographing apparatus in accordance with a first example of the present invention.

FIG. 1 is a block diagram of a photographing apparatus 100. The photographing apparatus 100 has an optical system 10, a sensor section 12, a signal processor 14 and a memory 16, which work as a photographing section. The photographing apparatus 100 has a controller 20 to control the photographing section and an operation section 22 to receive inputs from the user. The operation section 22 is composed of buttons or a touch panel for example.

The optical system 10 provides an image of a subject to the sensor section 12, and is composed of a combination of a spherical lens and an aspheric lens for example. The optical system 10 is configured as a zoom lens that can change the focal length by for example locating a number of lenses on the same optical axis and making the distance between lenses changeable. According to this configuration, the photographing apparatus 100 can change a photographing magnification when it photographs the subject because the controller 20 controls the optical system 10.

The sensor section 12 is composed of an imaging detector such as a CCD (Charge Coupled Device) or a CMOS (Complementary Metal Oxide Semiconductor) for example. The light of the subject led by the optical system 10 is converted into a signal charge by a sensor element in the sensor section 12. And the signal charge is converted into a signal voltage and sent to the signal processor 14. The sensor section 12 converts light signals into electrical signals as described above.

The signal processor 14 is composed of signal processing circuits that have several functions, and does both of analog processing and digital processing. By the signal processor 14, the electrical signals sent from the sensor section 12 are converted into a signal system (JPEG and MPEG for example) suitable for each use such as display and memory, and are then outputted. Data processed by the signal processor 14 are stored in the memory 16. The memory 16 is composed of a nonvolatile memory medium such as a hard disk drive or a flash memory.

The controller 20 is composed of a CPU for example and works as a control section that controls the photographing section and a whole apparatus by executing programs stored in the memory 16. By having an oscillating mechanism and a zoom mechanism, the photographing apparatus 100 can change at least one of a photographing direction and a photographing magnification. The controller 20 controls the photographing direction and a photographing magnification of the photographing section by controlling the oscillating mechanism and the zoom mechanism.

And the controller 20 works as a recognition section that recognizes a range specification image projected onto the subject and a calculation section that calculates a control parameter by using the range specification image as well. The range specification image shows a photographing area that the user wants to photograph, and is projected onto the subject by a projector, which is installed separately from the photographing apparatus 100 as discussed in more detail below. The control parameter is used to control at least one of a photographing direction and a photographing magnification of the photographing apparatus 100.

Figure 2:
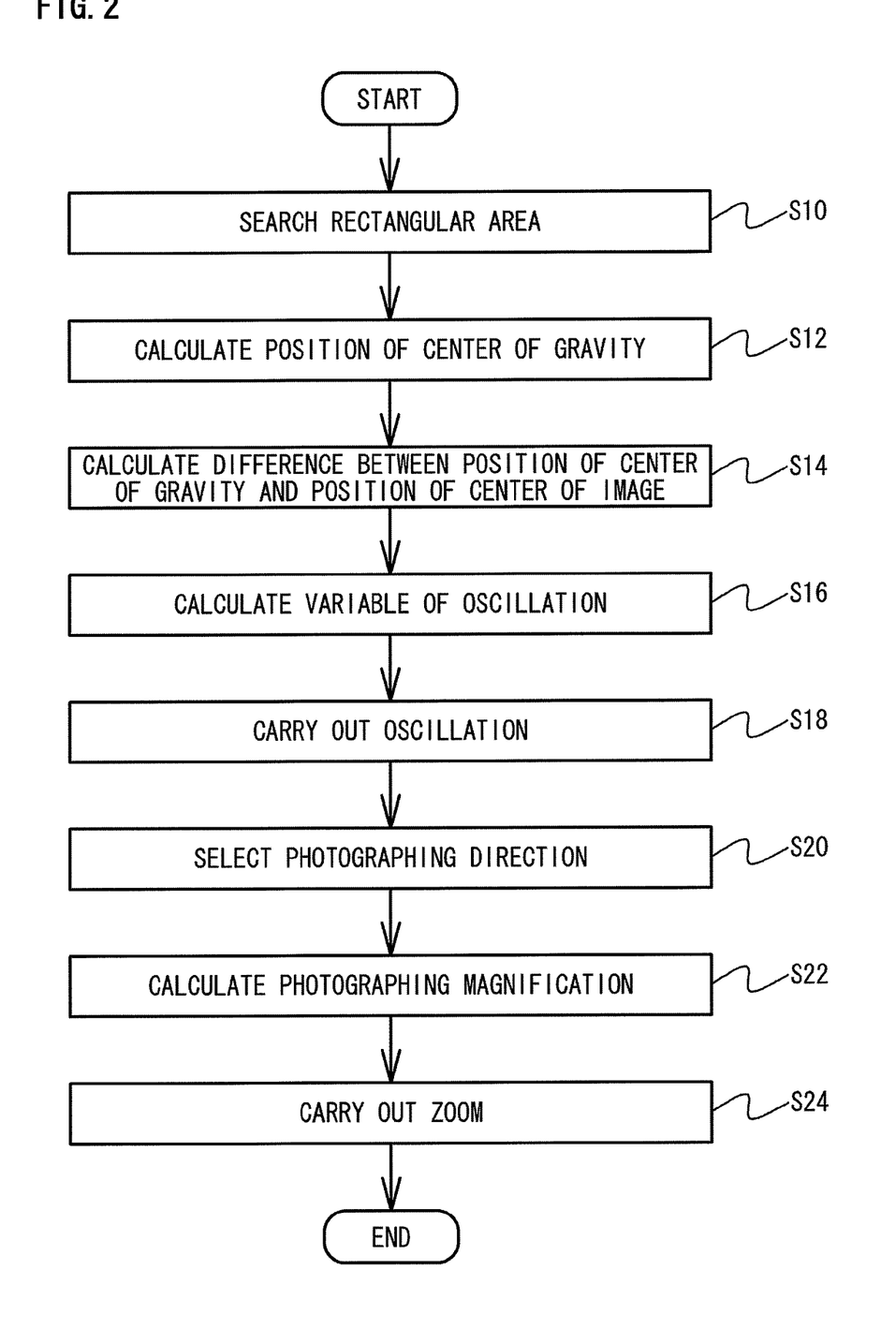
FIG. 2 is a flowchart showing procedures of a photographing apparatus in accordance with a first example of the present invention.
Figure 3:
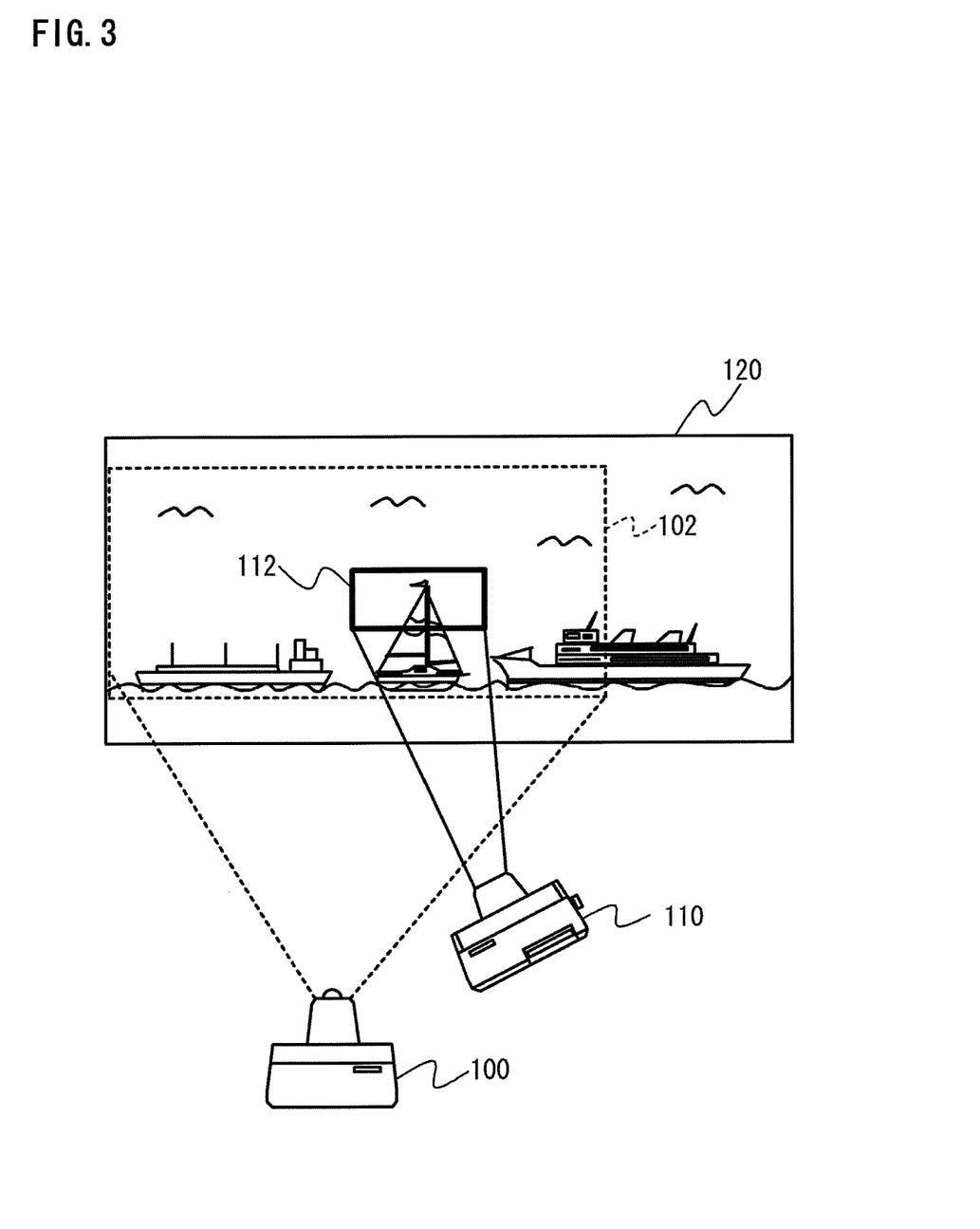
FIG. 3 is a schematic view illustrating a positional relation among a photographing apparatus, a projection apparatus and a subject in accordance with a first example of the present invention.

FIG. 2 is a flowchart showing procedures of the photographing apparatus 100. FIG. 3 is a schematic view illustrating a positional relation among the photographing apparatus 100, a projection apparatus 110 and a subject 120 in accordance with the first example of the present invention. FIGS.

4A through 4C illustrate images photographed by the photographing apparatus 100, and correspond to step S10, step S18, and step S24 in FIG. 2, respectively.

As shown in FIG. 3, when the photographing apparatus 100 starts, the projection apparatus 110 projects a rectangular area 112 (a range specification image) onto a subject 120. The rectangular area 112 specifies a part of the subject 120 photographed by the photographing apparatus 100. A user arbitrarily changes the specification range of the rectangular area 112 by operating the projection apparatus 110, and can make the photographing apparatus 100 photograph the area that the user wants to photograph.

Figure 4A:
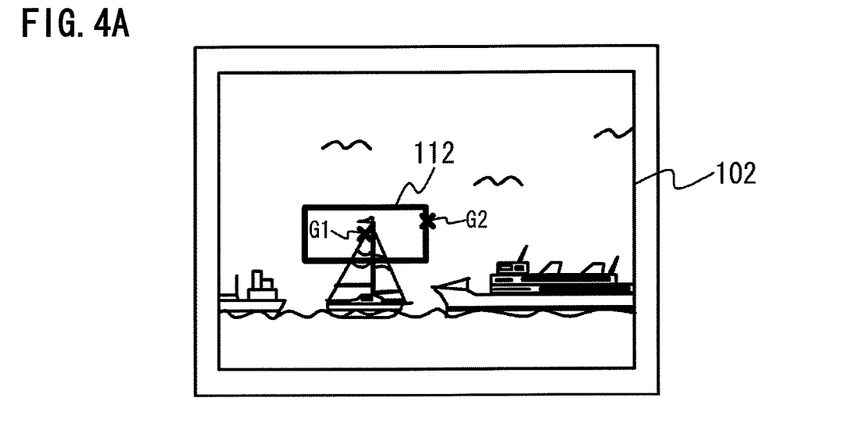
FIGS. 4A through 4C illustrate a photographing screen of a photographing apparatus in accordance with a first example of the present invention.

As shown in FIG. 4A, the controller 20 searches for the rectangular area 112 from a photographing range 102 photographed by the photographing apparatus 100 (step S10) Next, the controller 20 calculates the position of the center of gravity G1 of the rectangular area (step S12), and calculates the difference between the center position G2 of a photographic image and the position of the center of gravity G1 of the rectangular area 112 (step S14).

Figure 4B:
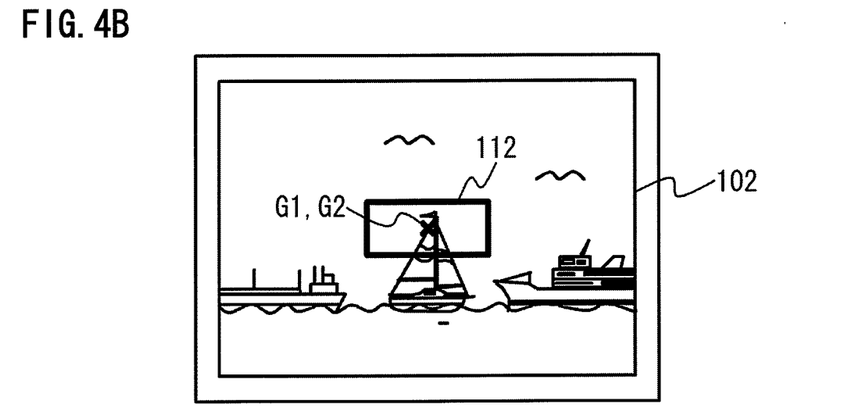

Then, the controller 20 calculates the amount of oscillation of the photographing apparatus 100 (step S16). Subsequently, the controller 20 controls the oscillating mechanism based on the amount of oscillation calculated and makes the photographing apparatus 100 carry out an oscillation (step S18). As a result, the position of the center of gravity G1 of the rectangle area and the position of the center of gravity G2 of the photographing area accord. By the steps described above, the photographing direction of the photographing apparatus 100 is decided.

Figure 4C:
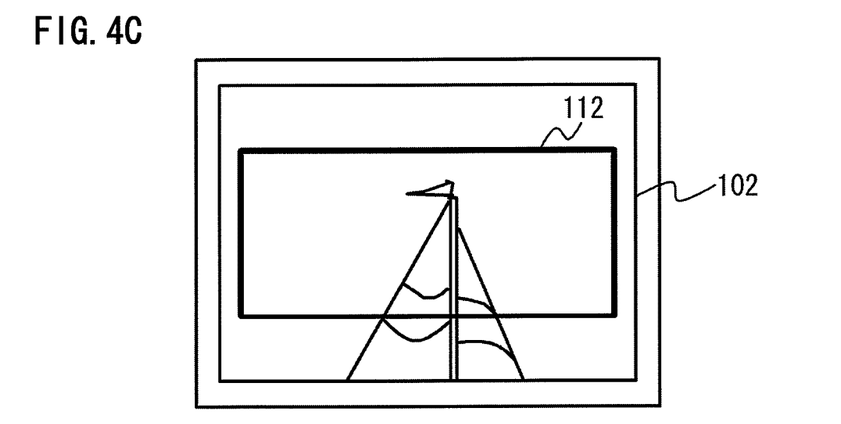

The controller 20 selects a photographing direction between a vertical direction and a horizontal direction of the rectangular area 112 (step S20). As shown in FIG. 4C, the controller 20 calculates a photographing magnification so that the direction selected (horizontal direction in this case) in step S20 of the rectangular area 112 is adjusted to the area of the photographing range 102 (step S22). And the controller 20 controls the zoom mechanism and makes the photographing apparatus 100 carry out a zoom (step S24). The photographing magnification of the photographing apparatus 100 is decided by the steps described above.

According to the photographing apparatus 100 of the first example, the controller 20 controls the photographing range of the photographing section based on the range specification image 112 projected onto the subject 120. This is expected to reduce the complexity of operations and improve the operability because the controller 20 controls the photographing section (the photographing direction and the photographing magnification for example) by simply projecting the range specification image 112 onto the photographing area that the user wants to photograph. Especially, this is expected to be able to set the oscillating angle and the zoom magnification of the photographing apparatus 100 adequately quickly when the user photographs a part of a certain subject up close.

For another way to specify the photographing area, there is a way to stick a physical marker on the subject as described above, but the subject on which the marker can be stuck is limited. For example, it is difficult to stick the marker on a very small size object and an amorphous object such as liquid. Because the way to specify the area described in the first example is the way to project the range specification image onto the subject, it is expected to be used to more subjects than the way of using a physical marker is expected. And changing the position and the range of the specification range is comparatively easy.

With the first example, the rectangular area 112 is described as an example of the range specification image, but a form (a circle, an oval, a polygon) other than the rectangle may be used as a range specification image. And by locating a number of points, the area surrounded by the points may be used as a photographing area, or a predetermined range around a single point may be used as a photographing area. In addition, it is preferable to use visible light or shade by visible light as a range specification image. But light having a wavelength other than that of visible light may be used to form the range specification image if the photographing apparatus 100 can recognize the light optically.

In the first example, the controller 20 calculates the mount of oscillation and a zoom magnification based on the position of the center of gravity and the length of the horizontal direction of the range specification image. It should be noted that this is just an example of the way to calculate the control parameter and it is possible to employ another way to control the photographing area based on the range specification image.

As shown in FIGS. 4A through 4C, in accordance with the first example, the controller 20 controls the photographing apparatus 100 to make the photographing apparatus 100 photograph the rectangular area 112 that the user specifies from the photographing range 102. When the photographing area that the user wants to photograph is out of the present photographing range 102, it is difficult to execute this control. Especially, repetitive zooming narrows the photographing area, and may increase the possibility that the area the user wants to photograph next is out of the present photographing area 102.

Figure 5:
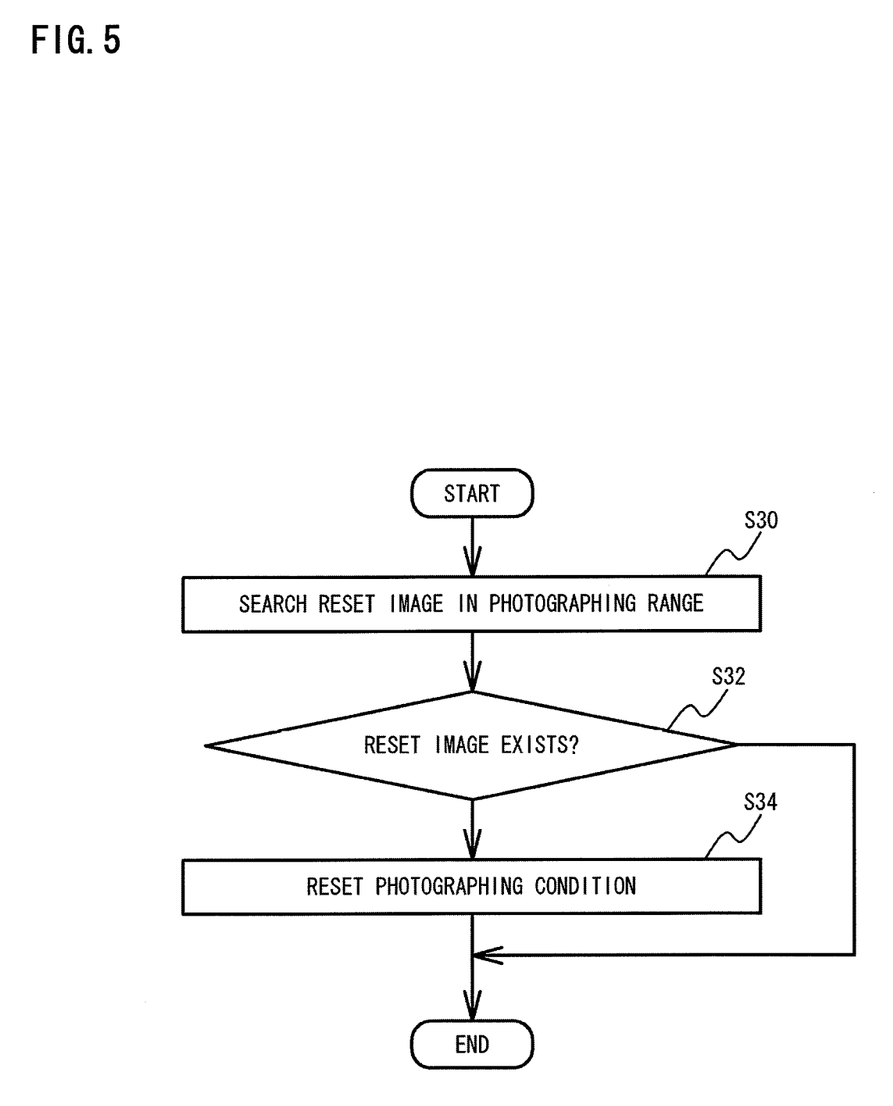
FIG. 5 is a flowchart showing procedures of a photographing apparatus in accordance with a transformation example of a first example of the present invention.
Figure 6A:
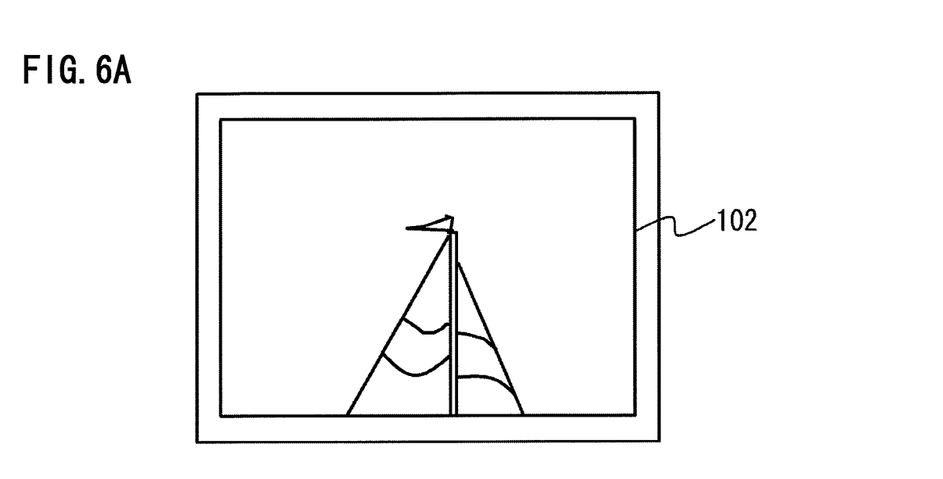
FIGS. 6A through 6C illustrate photographing screens of a photographing apparatus in accordance with a transformation example of a first example of the present invention.
Figure 6B:
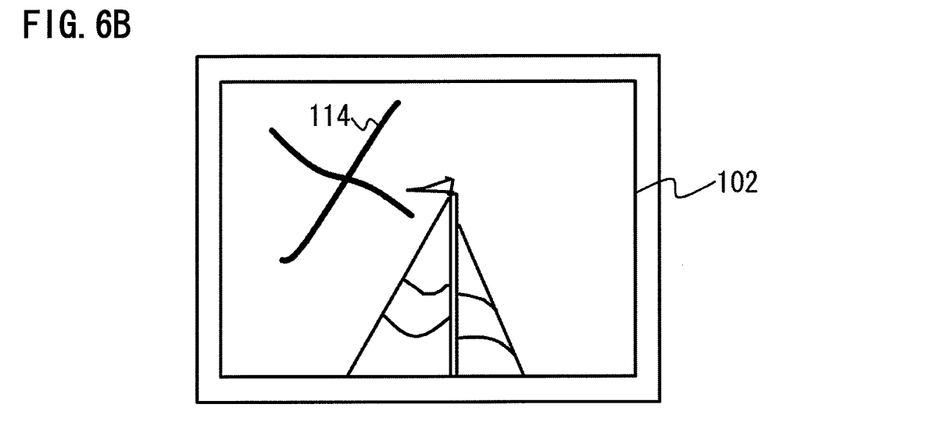
Figure 6C:
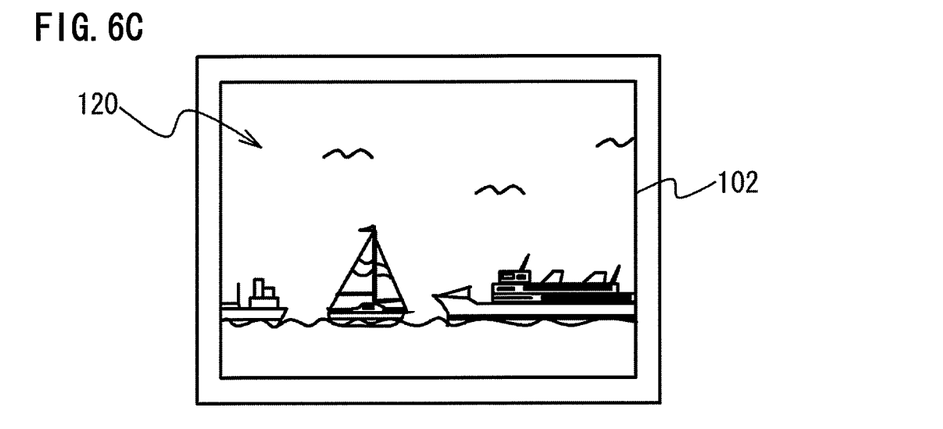

Therefore, as shown in FIG. 5, it is preferable that the controller 20 can make the photographing direction and the photographing magnification of the photographing apparatus 100 back to the predetermined condition under given conditions. FIG. 5 is a flowchart describing control procedures of the controller 20 to control the photographing apparatus 100. FIGS. 6A through 6C illustrate the image photographed by the photographing apparatus 100.

Referring to FIG. 6A, when the photographing apparatus 100 starts, the photographing apparatus 100 is controlled to zoom the area predetermined by the rectangular area 112. First the controller 20 searches for the present photographing range 102 (step S30), and determines whether there is a reset image in the area (step S32). The reset image is the committed symbol predetermined to reset the photographing apparatus 100 to the predetermined condition. Predetermined figure, symbol, line, character, and color may be used as the committed symbol. An X symbol is used as the committed symbol in following description.

As shown in FIG. 6B, when an X symbol 114 (a predetermined reset image) is in the photographing area, the controller 20 resets the photographing apparatus 100 to the predetermined condition (step S34). It is preferable that the predetermined condition is the condition that the photographing area contains the whole subject 120 for example as shown in FIG. 6C. The controller 20 controls an oscillating angle and a zoom magnification to make the photographing area contain the whole subject 120. The user can arbitrarily set the control parameter such as the amount of oscillation and the photographing magnification under the reset condition as well as those above. The controller 20 may have a number of conditions as the reset condition, and can control the photographing apparatus 100 based on the difference of the reset image projected.

As described above, the controller 20 works as a reset section that resets the photographing area of a photographing section to the predetermined condition when the predetermined reset image 114 is projected onto a photographing area. With this, when the user wants to specify the area which is out of the present photographing area, the user can specify a photographing area that the user wants to specify by using the range specification image 112 after the controller 20 makes the photographing apparatus 100 back to the reset condition (FIG. 6C) by projecting the reset image. By using the range specification image 112 for both a zoom movement and a reset movement of the photographing apparatus 100, it is expected that for users a complexity of the control operation decreases and operability improves more.

Figure 7:
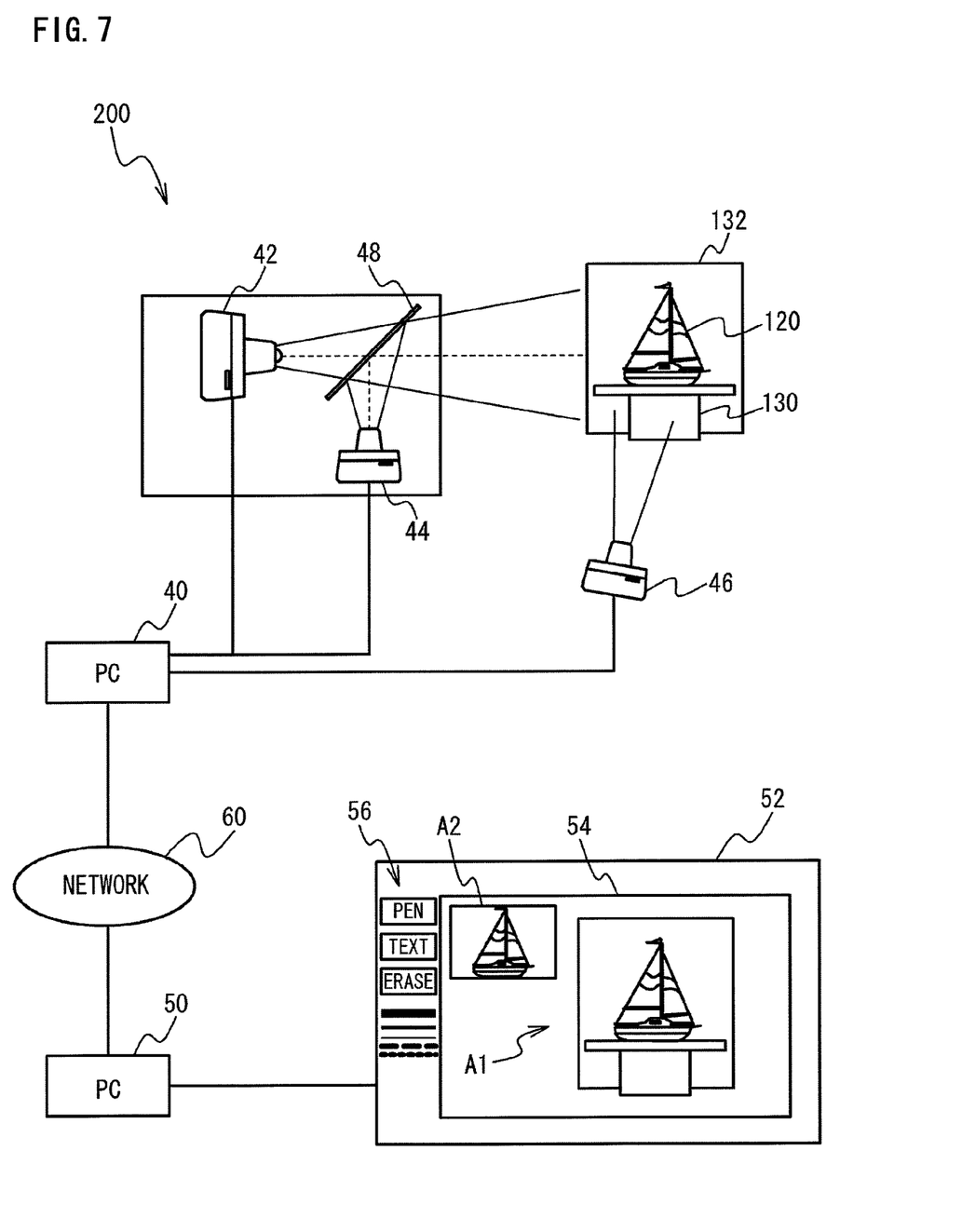
FIG. 7 is a block diagram showing configurations of a photographing system in accordance with a second example of the present invention.

A second example of the present invention will be now described. The second example is the example applying the present invention to a photographing system having a remote indication mechanism. FIG. 7 is a block diagram of configurations of the photographing system in accordance with the second example. Same reference numerals are used for similar structural elements to those of the first example.

A photographing system 200 in FIG. 7 has a personal computer (PC) 40 that works as a server and a PC 50 that works as a client (external terminal), which are connected each other through a network 60. A projector 42, a whole camera 44, and a zoom camera 46 are connected to the server-side PC 40.

The projector 42 works as a projection section that projects an image onto the subject 120 located on a table 130 through a half mirror 48 based on a control command from the PC 40. The image that the projector 42 projects contains the range specification image as described below.

The whole camera 44 is fixed on a pedestal such as a table, and works as a first photographing section to photograph the subject 120. The whole camera 44 photographs the reflecting image of a screen 132 that contains the subject 120 by the half mirror 48, and outputs a photographic image to the PC 40. It is preferable that the oscillating angle and the zoom magnification of the whole camera 44 are set so that the whole camera 44 can photograph the whole subject 120. In addition, the projector 42 and the whole camera 44 are installed in the position of 90 degrees across the half mirror each other, and an optical axis and an view angle of both accord. It is preferable that the positional relation between the whole camera 44 and the projector 42 is fixed during photographing.

The zoom camera 46 works as the second photographing section to photograph a part of the subject 120 photographed by the whole camera 44. The zoom camera 46 does not need to be fixed like the whole camera 44, and may have a movement mechanism to photograph from any position. The zoom camera 46 has the mechanism that can change at least one of the oscillating angle and the zoom magnification by the control of the PC 40, and can change at least one of the photographing direction and the photographing magnification by that mechanism.

The PC 40 outputs the photographic image photographed by the whole camera 44 and the zoom camera 46 to the client-side PC 50 through the network 60. A display apparatus 52 is connected to the PC 50, and has a display area 54 and an input area 56. A display area 54 displays the photographic image of the whole camera 44 and the zoom camera 46 sent from the PC 40. As illustrated, a whole image A1 from the whole camera 44 is displayed at the center of the display area 54, and a partial image A2 of the zoom camera 46 is displayed in another window at the upper left of the display area 54.

The input area 56 is a user interface that receives commands from a user, and contains various buttons (the user can select pen, text and erase for example) and icons (the user can specify line type and color for example). For example, when a pen button in the input area 56 is held down, the user can draw graphics and write texts in the display area 54 with input means such as a mouse discussed below. When the graphics are drawn on the subject 120 in the display area 54, information on the graphics such as coordinate data is outputted to the PC 40 from the PC 50. The PC 40 decodes the coordinate data of the graphics, converts them to the projection image of the projector 42, and outputs it to the projector 42. As described before, because the projector 42 and the whole camera 44 are installed on the same optical axis across the half mirror 48, the image of the projector 42 can be projected onto the same position where the user recognizes by the whole image A1 in the display area 54.

The PC 50 outputs the control command to the PC 40, and can control the movement of the projector 42, the whole camera 44 and the zoom camera 46 (for example, the zoom magnification and brightness of the whole camera 44 and brightness of the image of the projector 42). In addition, in this example, the photographing system 200 has only the PC 50 as a client, but the photographing system 200 may have multiple clients (PC).

In the photographing system 200 described above, the image photographed by the whole camera 44 and the zoom camera 46 is displayed on the display apparatus 52, and the image input through the PC 50 is projected onto the subject 120 by the projector 42. The graphics and texts that the user draws or writes with the PC 50 are projected onto the relational position of the subject 120 and of the screen 132, and the user can recognize these texts and graphics by the images that the whole camera 44 and the zoom camera 46 photograph. This enables the communication between the user of the PC 40 and the user of the PC 50 with the subject 120 that is real for example.

Figure 8:
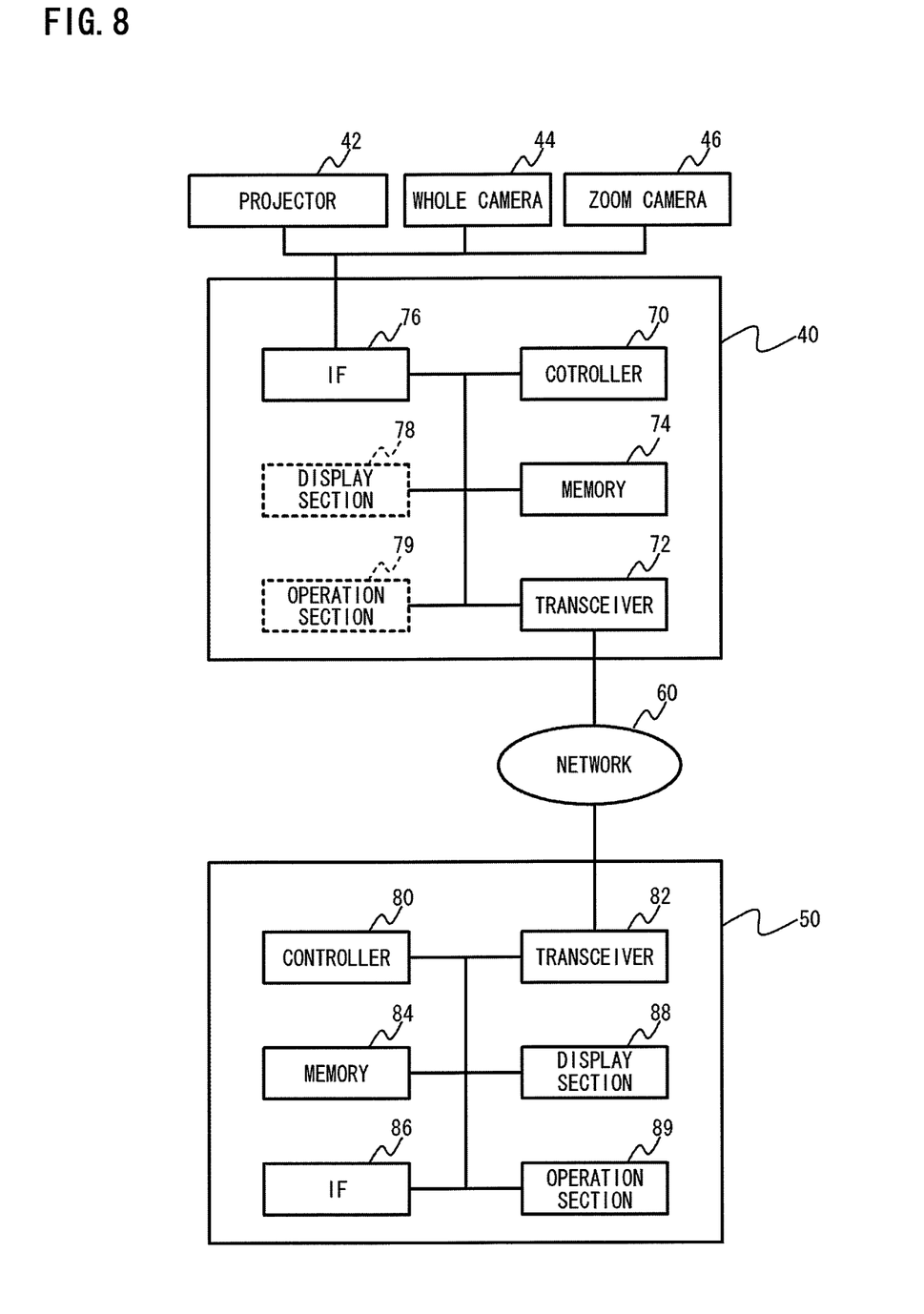
FIG. 8 is a block diagram showing functional configurations of a photographing system in accordance with a second example of the present invention.

FIG. 8 is a block diagram showing the functional configurations of the PC 40 and the PC 50. The PC 40 has a controller 70, a transceiver 72, a memory 74, and an interface (IF) 76. The controller 70 (a control section, a recognition section, a calculation section) controls the projector 42, the whole camera 44, the zoom camera 46 and the whole apparatus, recognizes the range specification image described below, and calculates the control parameter based on it. The controller 70 may be realized by the execution of the programs stored in the memory 74 with CPU for example. The transceiver 72 transmits and receives data with the PC 50 through the network 60 and may be realized by a network interface for example. The memory 74 stores various data such as photographic image data and control programs, and may be realized by a ROM (READ ONLY MEMORY) or hard disk drive (HDD).

The interface 76 functions to connect the PC 40 with the projector 42, the whole camera 44 and the zoom camera 46, and may be realized by a USB (Universal Serial Bus) interface for example. Furthermore, the PC 40 may have a display section 78 that displays a photographic image and an operation section 79 including a mouse and a keyboard.

The PC 50 has a controller 80, a transceiver 82, a memory 84, an interface (IF) 86, a display section 88 and an operation section 89. The controller 80 controls the whole apparatus, and is realized by the execution of the programs stored in the memory 84 with CPU for example. The transceiver 82 transmits and receives data with the PC 40 through the network 60, and is realized by a network interface for example. The memory 84 stores various programs and data, and may be realized by ROM or HDD for example. The interface (IF) 86 is realized by a USB interface for example, and can be connected with external devices such as a microphone and a speaker.

The display section 88 is realized by a display installed in the PC 50 for example. The operation section 89 is realized by a mouse, a keyboard, and a touch panel for example. The PC 50 can display image data and input instructions, with the display section 88 and the operation section 89 instead of the display apparatus 52 shown in FIG. 7.

Figure 9:
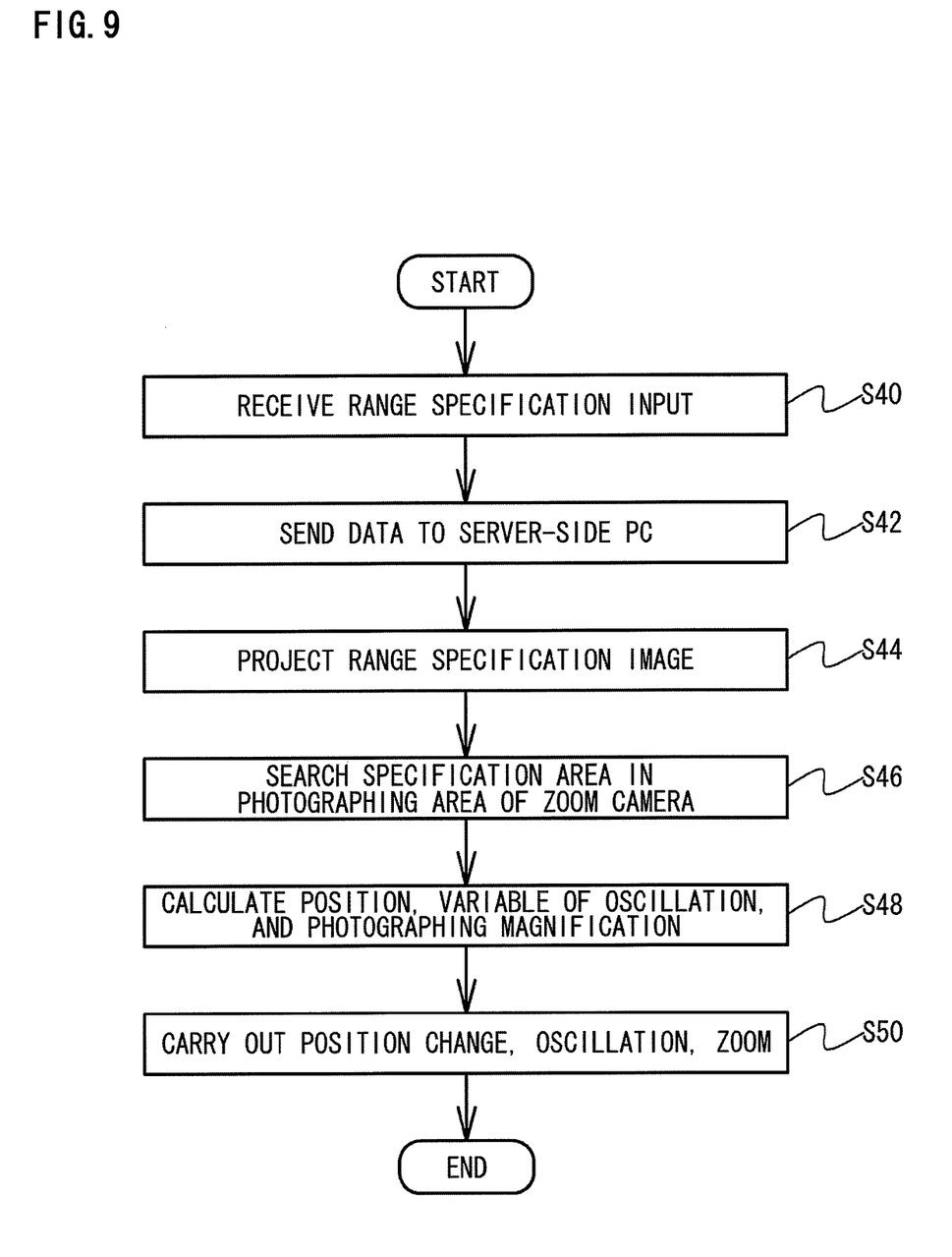
FIG. 9 is a flowchart showing procedures of a photographing system in accordance with a second example of the present invention.
Figure 10A:
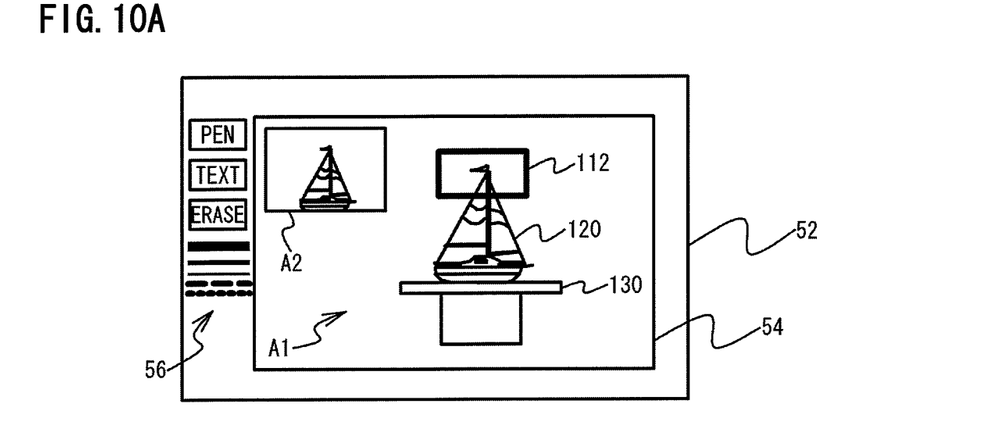
FIGS. 10A through 10C illustrate display screens of a client-side PC included in a photographing system in accordance with a second example of the present invention.
Figure 10B:
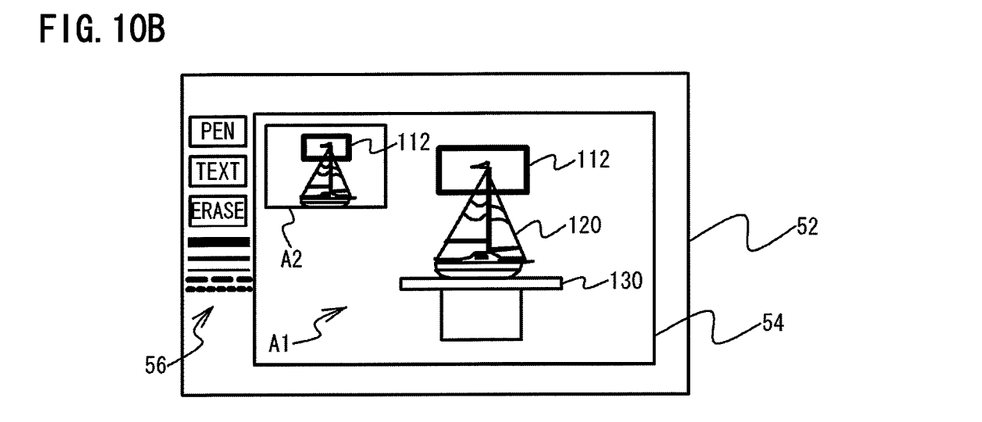
Figure 10C:
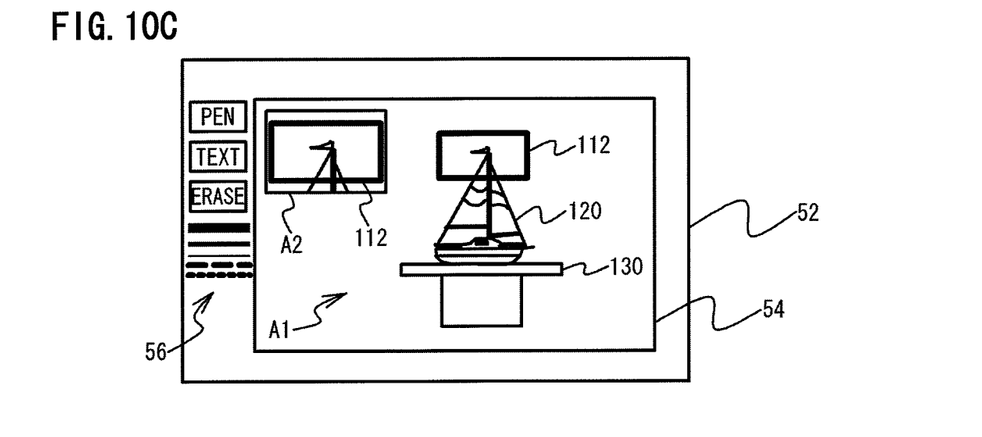

FIG. 9 is a flowchart showing procedures of a photographing apparatus according to the second example. FIGS. 10A through 10C illustrate a display screen of the display apparatus 52 connected to the PC 50, and corresponds to step S40, S44 and S50 in FIG. 9. In addition, in the display screen in FIGS. 10A through 10C, the screen 132 is not shown.

First, the operation section 89 of the PC 50 receives the range specification input by the user (step S40). As shown in FIG. 10A, the user specifies a part that the user wants to zoom from the whole image A1 displayed in the display area 54 of the display apparatus 52 by enclosing the part in the rectangular area 112 with an input tool such as a mouse or a touch pen. The graphics and the predetermined text other than a rectangle may be used for specifying the range. The controller 80 of the PC 50 sends the image data, which specifies the area input by the operation section 89, to the server-side PC 40 through the transceiver 82 and the network 60 (step S42). The controller 70 of the PC 40 decodes image data received from the PC 50, and projects the range specification image onto the subject 120 by the projector 42 (step S44). As shown in FIG. 10B, the projected rectangular area 112 can be checked in the partial image photographed by the zoom camera 46.

The controller 70 of the PC 40 adjusts the photographing direction and the photographing magnification of the zoom camera 46. First the controller searches for the range specification image in the photographing area of the zoom camera 46 (step S46). Then, the controller 70 calculates the control parameter that may include the amount of oscillation and the photographing magnification of the zoom camera 46 based on the range specification image searched (step S48). The controller 70 carries out an oscillation and a zoom of the zoom camera 46 based on the control parameter calculated (step S50). Here, the detail procedures from step S46 to S50 are the same as described in the flowchart of the first example (FIG. 2). As shown in FIG. 10C, the area specified with the rectangular area 112 is finally photographed by the zoom camera 46, and its image is displayed in the window of a partial image A2 of the display apparatus 52.

According to the photographing system of the second example, the zoom camera 46 is controlled based on the range specification image projected onto the subject 120 by the projector 42. The way to control the zoom camera may use the coordinate conversion parameters between the whole camera and the zoom camera. More specifically, it is to pre-calculate the correspondence relation between each coordinate of the whole image A1 photographed by the whole camera 44 and each coordinate of the partial image A2 photographed by the zoom camera 46. Because the range specification input by the user is equal to each coordinate of the whole image A1, it can be converted to each coordinate of the partial image A2 by using coordinate conversion parameters. The PC 40 can control the zoom camera 46 based on the coordinate of the partial image A2 converted.

A preexisting calibration such as a calculation of the conversion parameter is needed in the way to use the coordinate conversion parameter described above. Because the positional relation between the whole camera 44 and the zoom camera 46 is fixed during photographing, it is difficult to move the zoom camera 46 as needed. In contrast, in accordance with the way described in the second example, because the zoom camera 46 is controlled based on the range specification image projected onto the subject 120 by the projector 42, the preexisting calibration is not needed and the workload is reduced. This is expected to enable the wide area photographing by moving the zoom camera freely, because it is possible to keep photographing as long as the zoom camera 46 can recognize the range specification image 112 even though the positional relation between the whole camera 44 and the zoom camera 46 is changed.

The user can adjust the photographing range of the zoom camera 46 properly by only inputting the range specification image into the PC 50. Because the user only needs to draw the predetermined graphics or write the predetermined text on the screen of the display apparatus with the mouse or the touch pen, the range specification image can be input easily and at short times. The user can become proficient in the operation easily because visceral input is possible. As described above, according to the photographing system of the second example, it is expected that the complexity of the control operation of the zoom camera is reduced and the operability is drastically improved. Furthermore, it is expected that the user can specify the photographing range accurately by locating both the projector 42 as a projection section and the whole camera 44 as a first photographing section on the same optical axis, compared to by locating both on the different optical axis.

According to the second example, the projector 42 is used as a projection section to project the range specification image. The projector 42 can project various images other than the range specification image onto the subject 120, and is expected to be used as communication means between users. As described above, the whole system is expected to become more efficient because the projector 42 plays two rolls that are the specification section to specify the photographing area and the communication means.

In the second example, as described in FIGS. 5 through 6C of the first example, it is possible to add the control mechanism that resets the photographing range of the zoom camera to the predetermined condition based on the predetermined reset image. When the user inputs the reset image such as an X symbol with the operation section 89 of the client-side PC 50, the X symbol is projected onto the subject by the projector 42 connected to the server-side PC. When the projected X symbol enters the photographing area of the whole camera 44 and the zoom camera 46, the controller 70 of the PC 40 resets the photographing area of the zoom camera 46. As described, the controller 70 can be the configuration that works as a reset section. According to the second example, it is expected that the reset image input by the user is always recognized by the whole camera, because the photographing area of the projector 42 and the photographing area of the whole camera 44 accord.

The foregoing description of the examples has been provided for the purposes of illustration and description, and it is not intended to limit the scope of the invention. It should be understood that the invention may be implemented by other methods within the scope of the invention that satisfies requirements of a configuration of the present invention.

What is claimed is:

1. A photographing apparatus comprising:
   a photographing section that photographs a subject;
   a recognition section that recognizes a range specification image projected onto the subject; and
   a controller that controls a photographing section to change a photographing magnification of the photographing section according to the range specification image recognized by the recognition section, controls a photographing direction of the photographing section to make a position of a center of gravity of a photographing range of the photographing section correspond to a position of a center of gravity of the range specification image, and controls the photographing section to photograph the subject at the photographing magnification in the photographing direction, wherein the controller functions as a reset section that resets the photographing section to a predetermined condition when a predetermined reset image is projected onto the photographing range of the photographing section, wherein the predetermined reset image comprises a first reset image and a second reset image, wherein the predetermined condition comprises a first reset condition that resets the photographing direction and a second reset condition that resets the photographing magnification, and wherein the reset section resets the photographing direction in response to detection of the first reset image and resets the photographing magnification in response to detection of the second reset image.

2. A photographing apparatus comprising:

a photographing section that photographs a subject;

a recognition section that recognizes a range specification image projected onto the subject; and a controller that controls a photographing section to change a photographing magnification of the photographing section according to the range specification image recognized by the recognition section, controls a photographing direction of the photographing section to make a position of a center of gravity of a photographing range of the photographing section correspond to a position of a center of gravity of the range specification image, and controls the photographing section to photograph the subject at the photographing magnification in the photographing direction, wherein the controller functions as a reset section that resets the photographing section to a predetermined condition when a predetermined reset image is projected onto the photographing range of the photographing section, wherein the predetermined reset image comprises a first reset image and a second reset image, wherein the predetermined condition comprises a first reset condition that resets the photographing section to a first state and a second reset condition that resets the photographing section to a second state different from the first state, and wherein the reset section resets the photographing section to the first state in response to detection of the first reset image and resets the photographing section to the second state in response to detection of the second reset image.

* * * * *